US005638731A

United States Patent [19]

Garuglieri

[11] Patent Number: 5,638,731

[45] Date of Patent: Jun. 17, 1997

[54] CHOP SAW ARRANGEMENT

[75] Inventor: Andrea Garuglieri, Colle Brianza, Italy

[73] Assignee: Black & Decker Inc., Newark, Del.

[21] Appl. No.: 273,053

[22] Filed: Jul. 8, 1994

[30] Foreign Application Priority Data

Jul. 8, 1993 [GB] United Kingdom .................... 9314164

[51] Int. Cl.$^{6}$ .................................................. B23D 45/04

[52] U.S. Cl. ................................ 83/397; 83/478; 83/490; 83/581; 83/544

[58] Field of Search ............................. 83/478, 544, 397, 83/471.2, 471.3, 581, 490

[56] References Cited

U.S. PATENT DOCUMENTS

| | | | |
|---|---|---|---|
| 2,320,743 | 6/1943 | Nilsen | 83/397 |
| 3,922,785 | 12/1975 | Fushiya | 83/478 |
| 3,994,192 | 11/1976 | Faig | 83/490 |
| 4,005,622 | 2/1977 | Bassett | 81/180 R |
| 4,028,975 | 6/1977 | Bennett | 83/490 X |
| 4,176,571 | 12/1979 | Batson | 83/397 |
| 4,402,241 | 9/1983 | Moores | 83/478 |
| 4,507,999 | 4/1985 | Dezern | 83/665 |
| 4,581,966 | 4/1986 | Kaiser | 83/478 X |
| 4,672,746 | 6/1987 | Zeilenga | 83/478 X |
| 4,693,008 | 9/1987 | Velie | 83/478 X |
| 4,774,866 | 10/1988 | Dehari et al. | 83/478 |
| 4,799,416 | 1/1989 | Kumasaka et al. | 83/478 X |
| 4,805,504 | 2/1989 | Fushiya et al. | 83/397 |
| 4,892,022 | 1/1990 | Cotton et al. | 83/490 X |
| 5,020,406 | 6/1991 | Sasaki | 83/478 X |
| 5,129,300 | 7/1992 | Kawakami | 83/471.2 |
| 5,146,825 | 9/1992 | Dehari | 83/478 X |
| 5,203,245 | 4/1993 | Terpstra | 83/478 X |
| 5,370,025 | 12/1994 | Itzov | 83/478 X |
| 5,383,383 | 1/1995 | Garuglieri | 83/666 |

FOREIGN PATENT DOCUMENTS

| | | | |
|---|---|---|---|
| 226429 | 3/1963 | Austria | 83/478 |
| 240588 | 6/1965 | Austria | 83/478 |
| 0131376 | 6/1984 | European Pat. Off. . | |
| 0450400 | 3/1991 | European Pat. Off. . | |
| 0538066 | 10/1992 | European Pat. Off. . | |
| 2275118 | 1/1975 | France . | |
| 3119573 | 12/1982 | Germany | 83/397 |
| 251401 | 10/1990 | Japan | 83/478 |

*Primary Examiner*—Rinaldi I. Rada
*Assistant Examiner*—Elizabeth Stanley
*Attorney, Agent, or Firm*—Adan Ayala; Frederick Voss; Charles E. Yocum

[57] ABSTRACT

A chop saw comprising a table, pivot member, saw assembly, upper guard, lower guard and lever utilizes the lever to maintain the position of the upper guard and lock the saw assembly in the upper rest position by engaging the lower guard with an extension of the lever. Disengagement of the lever from the lower guard, and pivoting of the saw assembly to the lower engaged position causes the lever to re-engage the lower guard to further open the lower guard and expose the blade.

12 Claims, 7 Drawing Sheets

CHOP SAW ARRANGEMENT

BACKGROUND OF THE INVENTION

This invention relates to circular saws of the type comprising a table, a pivot member on the table and a saw assembly pivoted about a pivot axis with respect to the pivot member, whereby the saw assembly carrying a motor driven blade can be plunged into a workpiece supported on the table.

Such saws are known and described in published patent documents such as EP 0133666 and EP 0450400. These saws are useful and have numerous possibilities for enhancement to improve the capacity, capability and efficiency, not to mention cleanliness and safety of their arrangements. On the other hand, all these features add complexity and cost, and may render the saw user-unfriendly.

Both EP 0133666 and EP 0450400 mentioned above describe saws in which the saw assembly comprises an upper guard and a lower guard for the blade. The upper guard is formed from or on the housing of the assembly and permanently covers a top part of the blade. A bottom part of the blade is covered by the lower guard, but this must be withdrawn in use so that the blade is exposed when required to perform cutting operations.

A handle is disposed on the upper guard or housing by means of which a user can pivot the saw assembly up and down to perform cutting operations on a workpiece supported on the table.

The lower guard may be opened entirely by an actuating lever disposed on the handle. Alternatively the guard may be opened automatically by pivoting of the saw assembly, there being provided a connection between the guard and the pivot member for this purpose. A further alternative is that the guard may be opened partly by either of these arrangements and only further opened by direct contact with a workpiece. None of these is ideal or covers every desirable eventuality. In particular it is desirable only to open the guard as much as is necessary to cut the workpiece and no more, otherwise the dangerous blade is needlessly exposed. In any event, it is desirable (and, indeed, essential in some jurisdictions) to provide the following two safety features: first, a lock on the lower guard so that it cannot be manipulated open except by proper operation of the saw; and second, a lock on the saw assembly so that it cannot pivot down from a rest position except by proper operation, involving a release of the lock.

SUMMARY OF THE INVENTION

It is an object of the present invention to provide a saw of the type described above which provides a good compromise between the often conflicting requirements of ease of use versus safety of use.

In accordance with the present invention there is provided a saw comprising a table, a pivot member on the table, a saw assembly pivoted with respect to the pivot member, a blade journalled in the assembly, a motor to drive the blade, an upper guard to cover an upper portion of the blade, the upper guard being pivoted to the assembly, a lower guard to cover a lower portion of the blade, the lower guard being pivoted to the assembly, a parallelogram lever having a pivoted connection to the pivot member and the upper guard to maintain the orientation of the upper guard with respect to the pivot member in all pivot positions of the assembly with respect to the pivot member, an extension of the parallelogram lever co-operating with the lower guard such that, in a raised rest position of the saw assembly with respect to the pivot member and in an unopened position of the lower guard with respect to the blade, the extension engages the lower guard and prevents pivoting of the assembly with respect to the pivot member, and means to open the lower guard to an extent sufficient to remove abutment thereof with the extension, whereupon subsequent pivoting of the saw assembly from the raised position serves to engage the extension with the lower guard to open further the lower guard.

Preferably the lower guard comprises a flange engaged by the extension. The guard opening means rotates the flange out of abutment with the extension. Further, the flange has a cam surface engaged by the extension on the subsequent pivoting of the saw assembly to further rotate and open the lower guard.

Preferably the extension and flange co-operate sufficiently to open the guard only as much as necessary with typically found workpieces to avoid contact of the lower guard with such workpieces, wherein the guard is capable of further opening on contact thereof with non-typical workpieces.

Preferably, the means to open the lower guard comprises an actuator lever connected with the lower guard to open the lower guard a first amount sufficient to withdraw the flange from abutment with the extension.

Preferably the actuator lever has means engaging the lower guard such that the lower guard cannot be opened without first activating the lever.

Thus the above arrangement provides two safety features. Firstly, the lower guard cannot be opened without first activating the lever. Thus accidents occasioned by unintentionally or carelessly manipulating the lower guard when the saw is in its raised, at-rest position can be avoided. Secondly, the assembly cannot be pivoted down until the lock formed by the extension abutting the flange is released. This is only achieved by opening the lower guard while activating the lever. Not only is this a safety feature but also, as a practical matter, it is desirable for the lower guard to be open before plunging the assembly into a workpiece, so as to avoid contact of the lower guard with the workpiece.

Preferably, the actuator lever is connected to the lower guard by a cable which has a small amount of "dead slack" in it so that the lower guard is not opened until the lever disengages the lower guard. Preferably the cable passes through an eye in the lever and is captivated on the lower guard so that the lower guard pushes the cable through the eye when the lower guard is further opened by the extension on the flange or by opening contact with a workpiece.

Preferably, the assembly comprises a housing mounting the motor and an axle disposed in a wall of the housing, a hollow spindle journalled for rotation about the axle on one side of the housing and carrying the blade. The lower guard may be mounted on the axle on the other side of the housing. Preferably, the housing has a cylindrical section around the spindle and the lower guard has a cup-shaped part supported on the cylindrical section.

Preferably, the upper guard is mounted on the axle beyond the lower guard with respect to the wall of the housing. The motor may drive the spindle through a belt surrounding the spindle. This provides an especially compact, self-supportive structure which also facilitates assembly.

BRIEF DESCRIPTION OF THE DRAWINGS

The invention is further described hereinafter, by way of example only, with reference to the accompanying drawings, in which.

DETAILED DESCRIPTION OF THE INVENTION

Figure 3C:
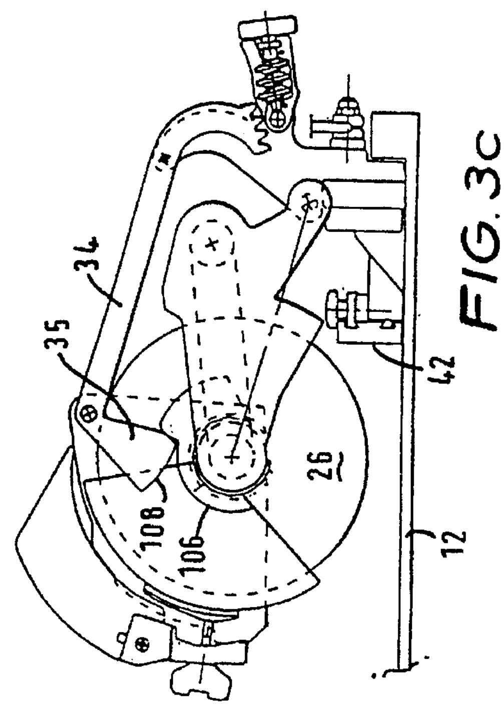
FIGS. 3*a* to 3*d* are side views in different positions of a saw according to the present invention.
Figure 3D:
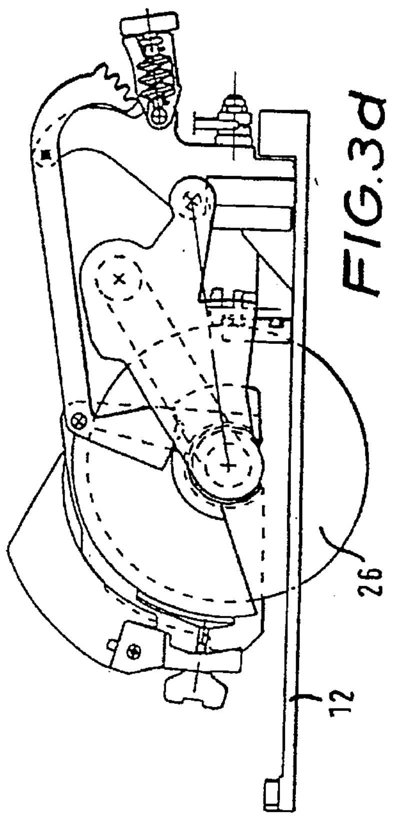
Figure 3A:
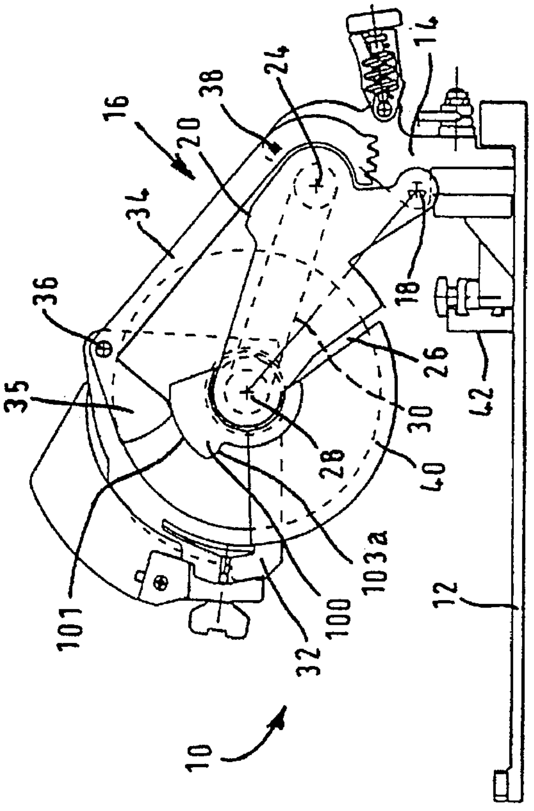

Referring first to FIG. 3*a*, a saw 10 according to the invention comprises a table 12 having a pivot member 14 to which a saw assembly 16 is pivoted about axis 18.

The saw assembly 16 comprises a housing 20 mounting a motor 22 (see also FIG. 1*b*) having a rotation axis 24. The motor 22 drives a circular saw blade 26 mounted in the housing 20 about axis 28 through a belt 30 drive connection.

An upper guard 32 is pivotally mounted in the housing 20 about axis 28. It is connected to the pivot member 14 by parallelogram lever 34, which is pivoted at both ends about axes 36,38. Lines joining axes 36,38 and 18,28 are parallel.

Figure 1A:
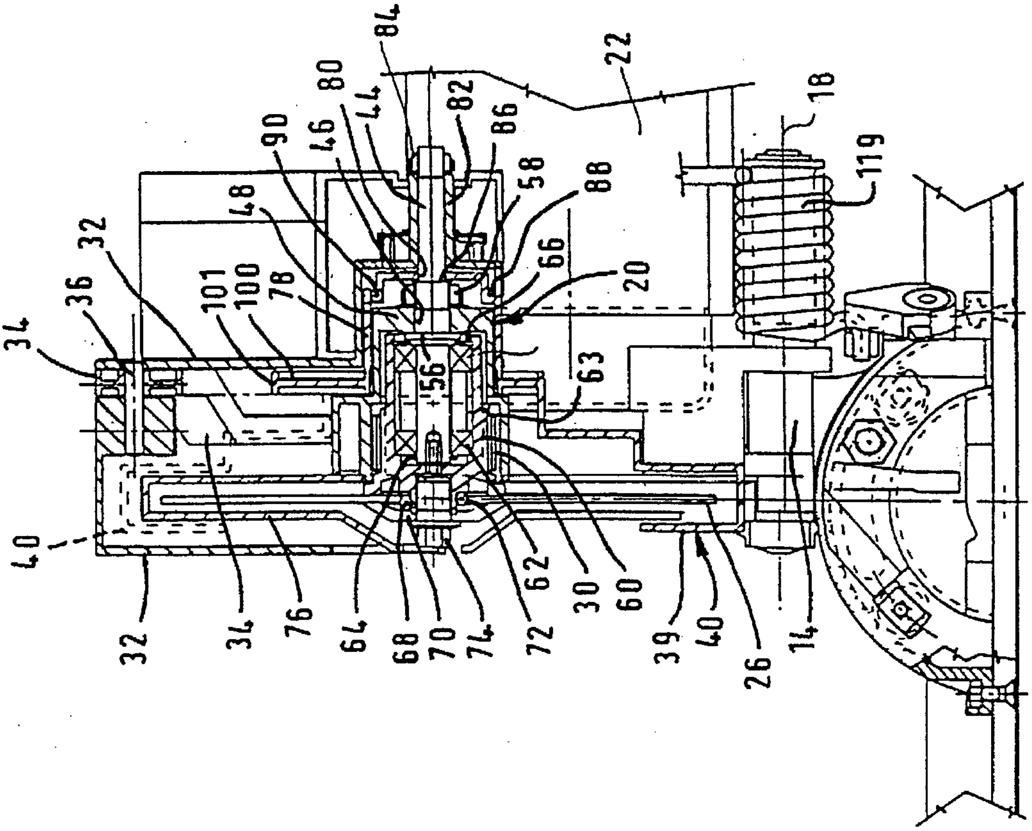
FIGS. 1*a*, 1*b*, 1*c* and 1*d* are sections through a saw assembly according to the present invention and taken along the line A—A, B—B, and C—C respectively in FIGS. 4*c* and 4*d*.

A lower guard 40 is likewise pivotally mounted in the housing 20 about axis 28. It is opened by means explained further below to expose the blade 26. When this is done, the saw assembly 16 is capable of pivoting down about axis 18 to plunge the blade 26 into a workpiece (not shown) supported on the table 12 against a fence 42. The table 12 has a slot 13 (see FIG. 1*c*) through which the blade passes as the assembly pivots down to the position shown in FIG. 3*d*.

The parallelogram lever 34 maintains the orientation of the upper guard 32 with respect to the pivot member 14 and hence the table 12.

Turning now to FIGS. 1*a* to 1*d*, the housing 20 mounts a blade axle 44 which passes through a bore 46 in wall 48 of the housing. The axle 44 is clamped against housing 20 between flange 56 of axle 44 and a nut 58.

A drive spindle 60*a* comprises a sleeve 60 which is rotatably journalled on the axle 44 through bearings 62. The bearings 62 are first slid onto the axle 44, together with intermediate spacer 63, until they abut flange 56. They are held in place by circlip 64. Then the sleeve 60 is slid over the bearings 62 and spacer 63 before being retained in position by circlip 66. The assembly so formed is then inserted in, and bolted to, the housing 20 by nut 58.

The closed end of the sleeve 60 has a flange 68 on which a flange washer 70 is seated. The blade 26 is seated on flange 72 of the washer 70. A bolt 74 clamps the assembly together.

The spindle 60*a*, and hence blade 26, is driven by belt 30, which partly surrounds the bearings 62 so that the load on the bearings is entirely radial. Moreover, the bearings are near the blade 26 so that the side forces produced by contact of the blade with the workpiece are minimised.

Figure 1B:
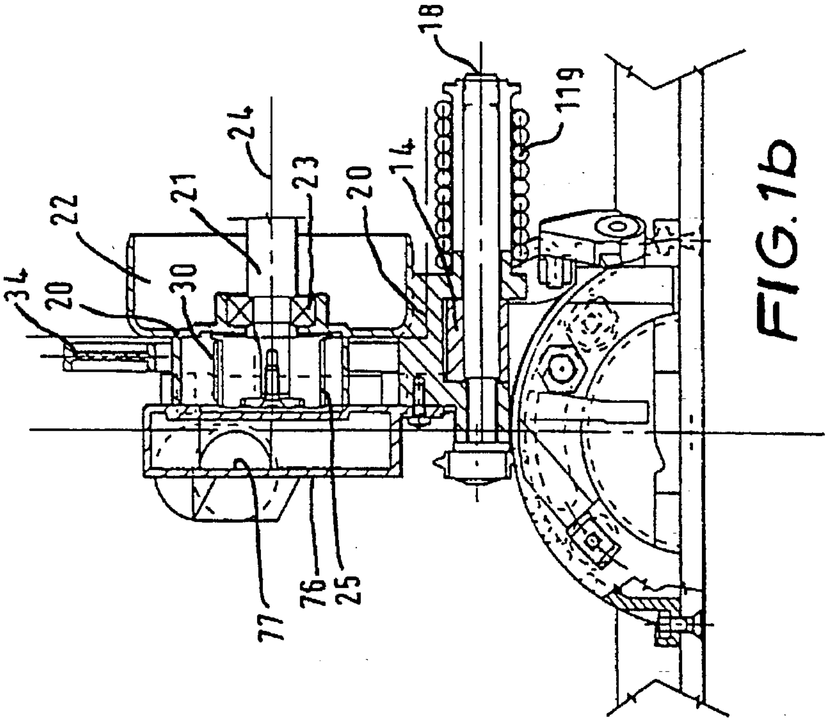
Figure 1D:
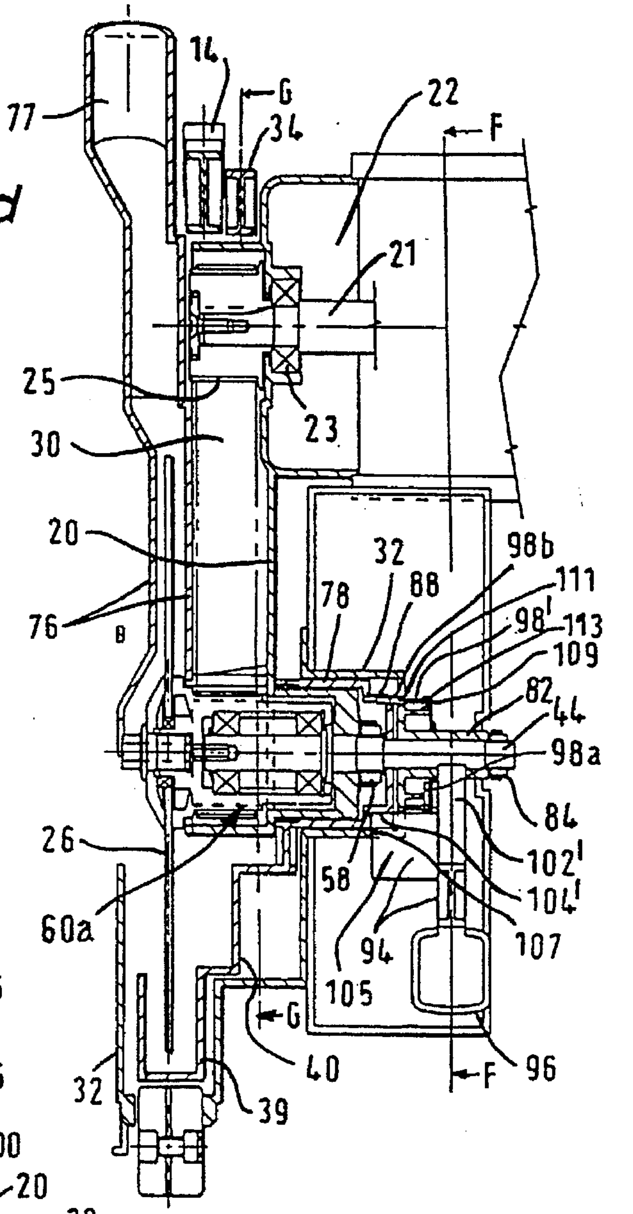
Figure 1C:
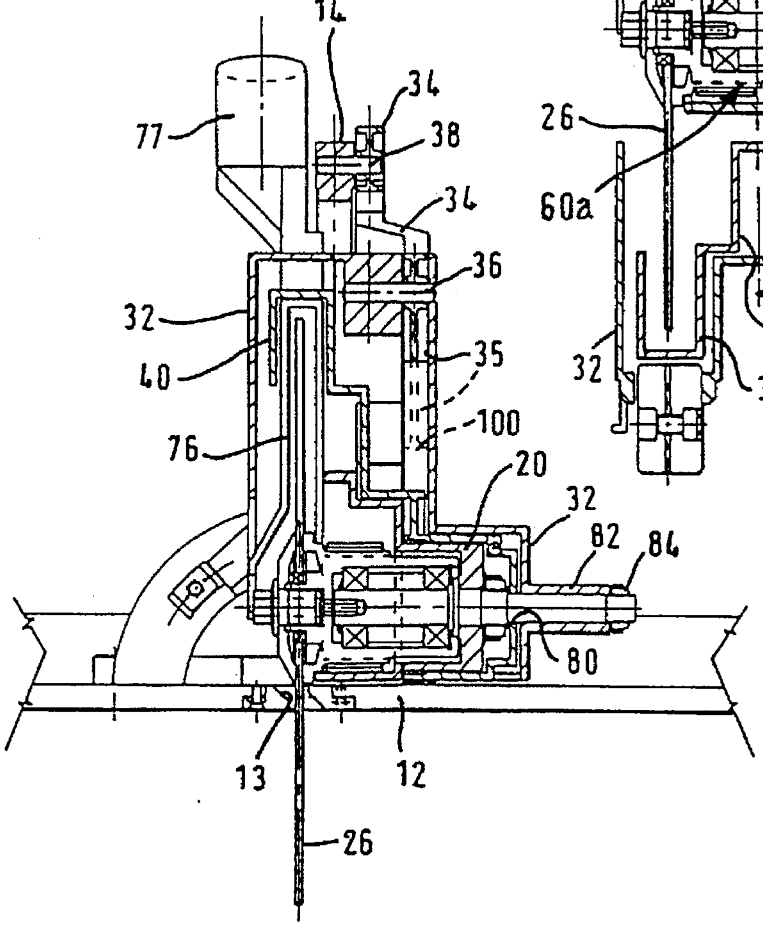

The motor 22 is shown in FIGS. 1*b* and 1*d*, and has an output shaft 21 journalled in the housing 20 through bearings 23. A pulley 25 is on the shaft 21 and around which the belt 30 is passed.

The housing 20 extends between pivot member 14 (at pivot axis 18, see also FIG. 3*a*), the motor 22 (at axis 24) and the axle 44, surrounding the belt 30 and sleeve 60. It extends backwards (relative to the blade 26) to capture the axle 44 through bore 46. It also extends forwards to form a fixed guard 76 of the blade 26. The guard 76 covers a rear portion of the blade 26, and opens into a rearwardly directed dust collection chute 77.

Around sleeve 60, the housing 20 is cylindrical and rotatably supports a partly cylindrical cup 78, which is part of the lower guard 40. The cup 78 has a bore 80 in its base through which the shaft 44 passes. The cup 78 is retained in position by a sleeve 82 of upper guard 32. Sleeve 82 is likewise rotatably supported on the shaft 44. A nut 84 retains sleeve 82 and cup 78 against shoulder 86 of the shaft 44.

Lower guard 40 has a segmental section 39 which covers a lower portion of the blade 26. In FIG. 1*a* it is shown in dashed lines in an open position, exposing the blade 26 from which it can be seen that it is outside of the housing 76 with respect to the blade.

The lower guard 40 is opened initially by a cable 88 wound around cup 78 and terminating at 90, whereas the cable 88 rotates the cup 78 and lower guard 40 around shaft 44. The other end of the cable 88 passes through an eye 92 (see FIGS. 2*a* to 2*d*) in an actuator lever 94 pivoted at 95 to a handle 96 forming part of the upper guard 32.

Figure 2C:
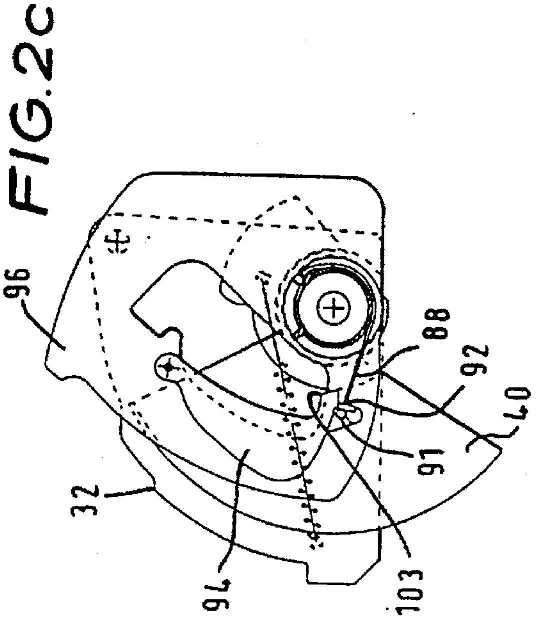
FIGS. 2*a* to 2*d* are views showing the lower guard opening arrangements of a saw according to the present invention.
Figure 2D:
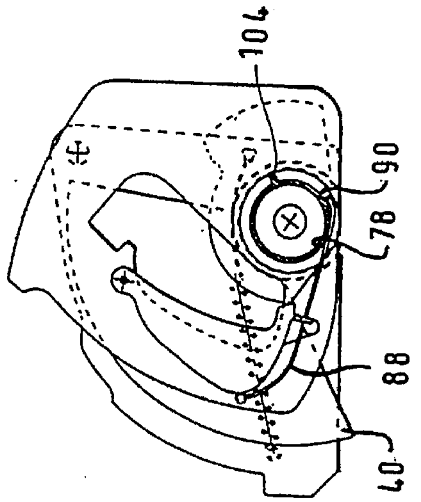
Figure 2A:
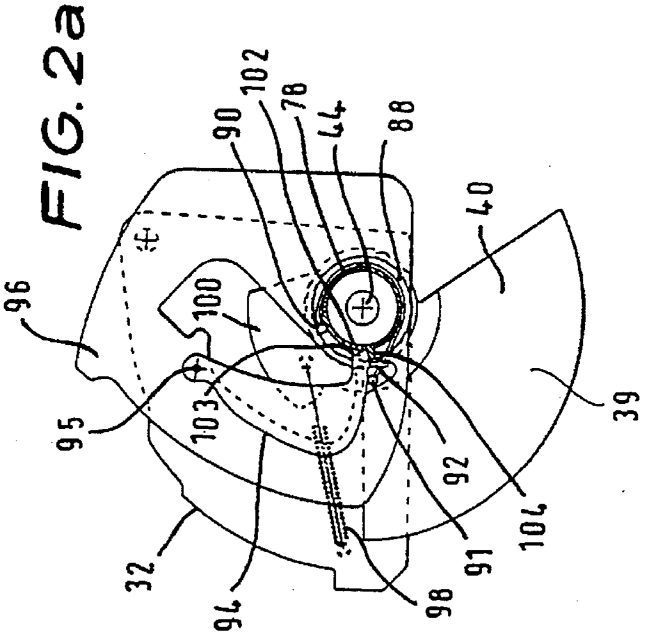

The lower guard 40 is biassed to the closed position thereof (which is shown in FIG. 2*a*) by a spring 98 which extends between the upper guard 32 and a flange 100 on the cup 78.

Figure 2B:
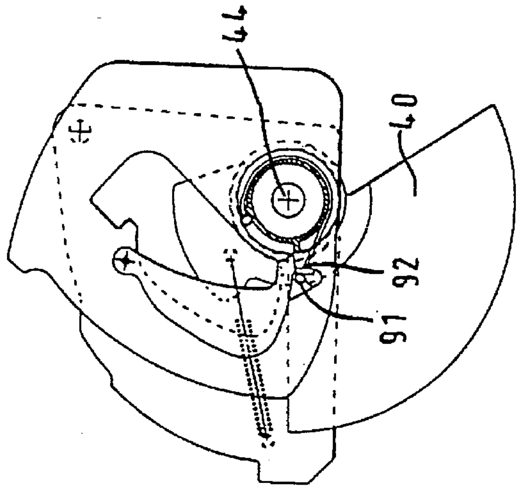

The actuator lever 94 has an extension 102 which engages a stop 104 on the cup 78. The lower guard 40 cannot be manipulated open until the extension 102 is withdrawn from the stop 104. This occurs during the first movement of the actuator lever 94, as shown in FIG. 2*b*.

The cable 88 passes freely through the eye 92. However, at the position shown in FIG. 2*b*, the other end of the cable, indicated as 91 in FIG. 2, engages the eye 92. Thereafter, further pivoting of the actuator lever 94 tensions the cable 88 and begins to open the lower guard 40, tensioning the spring 98 as shown in FIG. 2*c*.

FIG. 2*c* shows the fully pulled position of the actuator lever 94, although the lower guard 40 is only partially open. However, by means explained further below the lower guard 40 may be fully opened as shown in FIG. 2*d* and in this case the tension in the cable 88 is again relaxed and is fed through the eye 92 into a space in the handle 96. The actuator lever 94 may itself be biassed by a spring (not shown) to the position shown in FIG. 2*a*. Release of the actuator lever 94 in the position of the lower guard 40 shown in FIG. 2*d* would then return the actuator lever 94 to the FIG. 2*a* position. As the lower guard 40 is permitted to return to its closed position (again as explained further below), stop 104 engages curved rear surface 103 of the extension 102 and opens the actuator lever 94 sufficient to allow passage of the stop 104 before the extension 102 snaps back into the locking position shown in FIG. 2*a*.

Figure 3B:
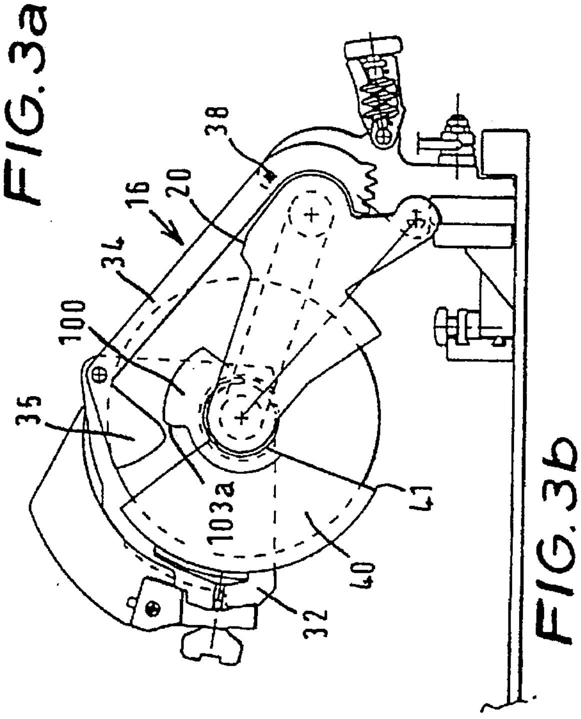
Figure 4B:
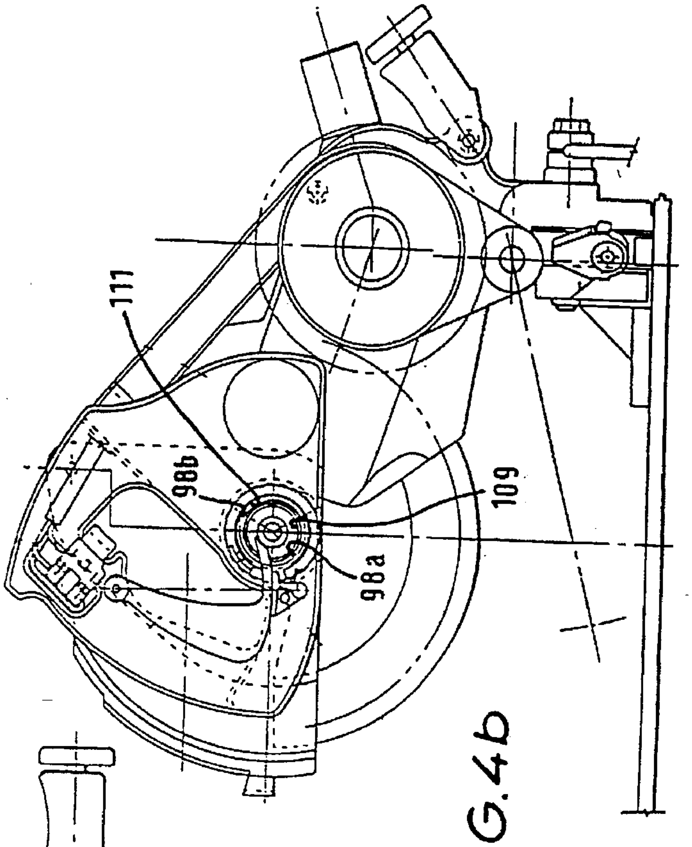
FIGS. 4*a* to 4*d* are more detailed side views of a different embodiment of the present invention in different positions, FIG. 4*a* being a section on the line G—G in FIG. 1*d* and FIGS. 4*b* to 4*d* being sections on the line F—F in FIG. 1*d*.
Figure 4A:
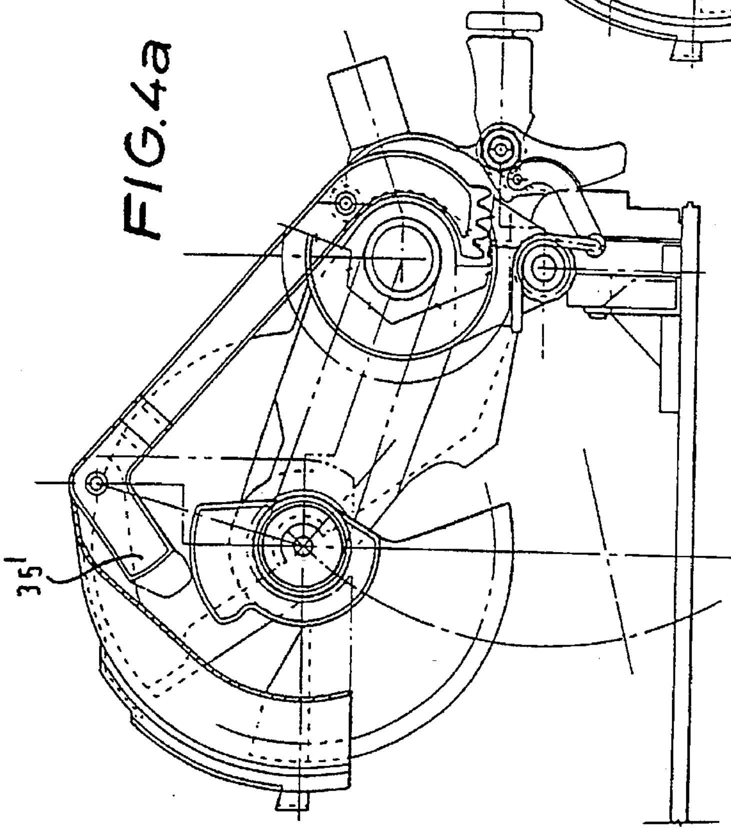
Figures 4C, 4D:
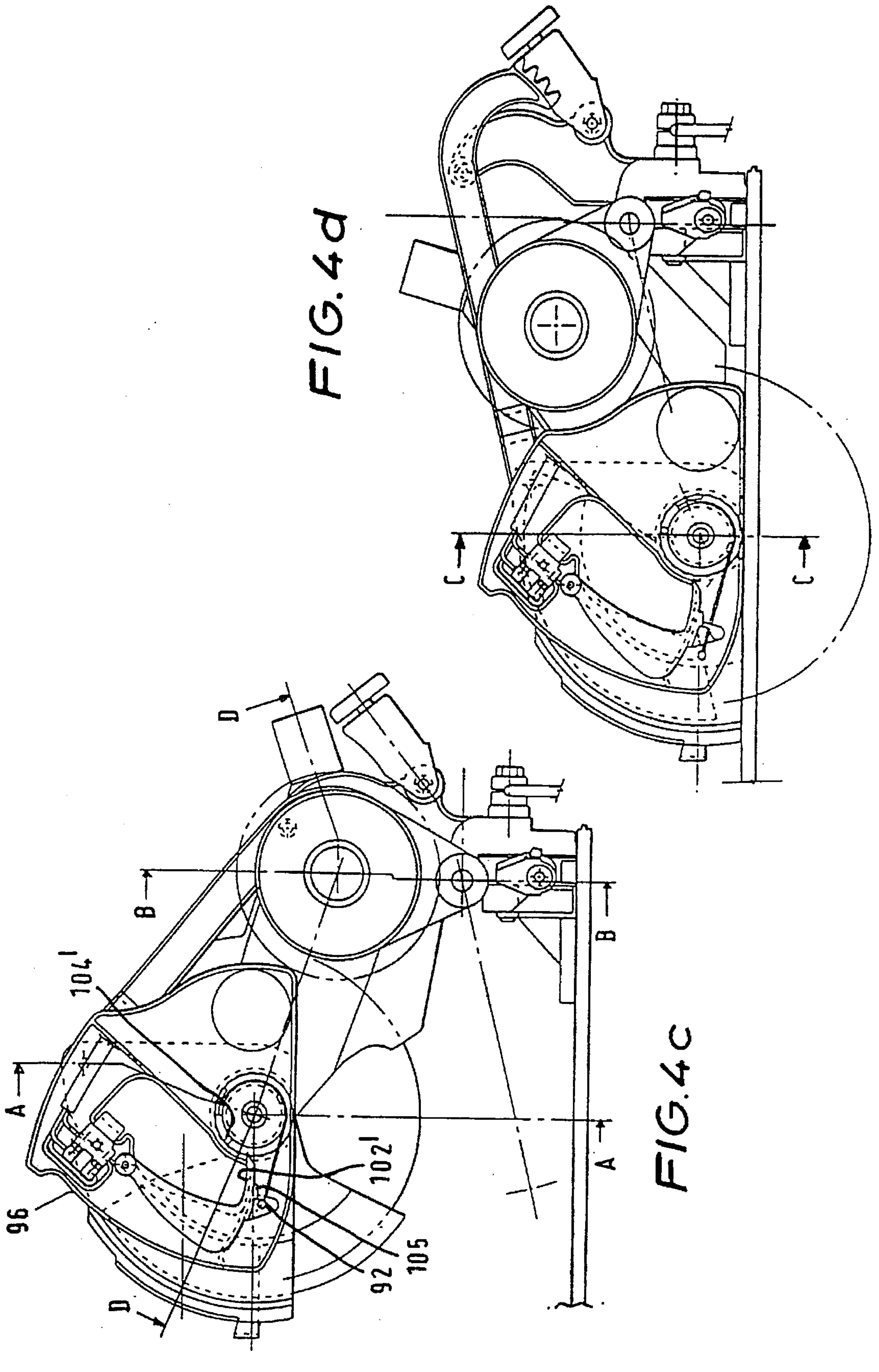
Figure 5A:
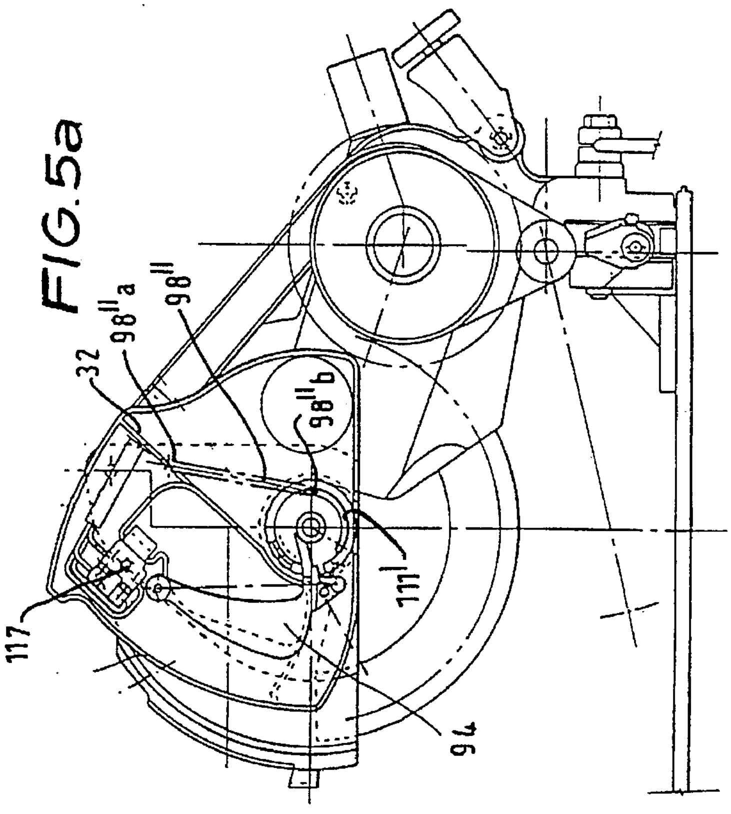
FIGS. 5*a* to 5*d* are similar views to those given above of another embodiment of the present invention.
Figure 5B:
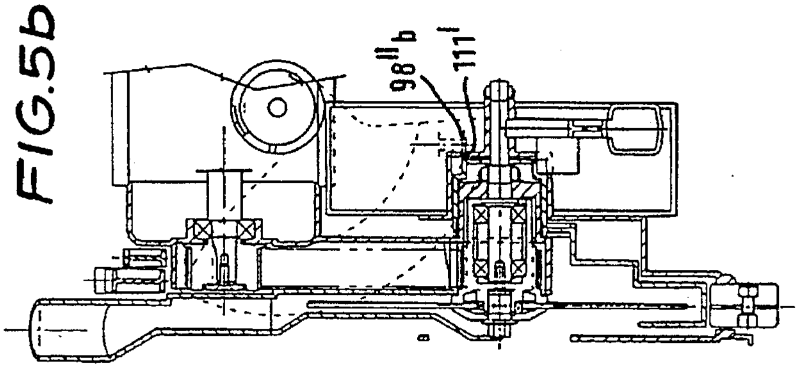
Figure 5C:
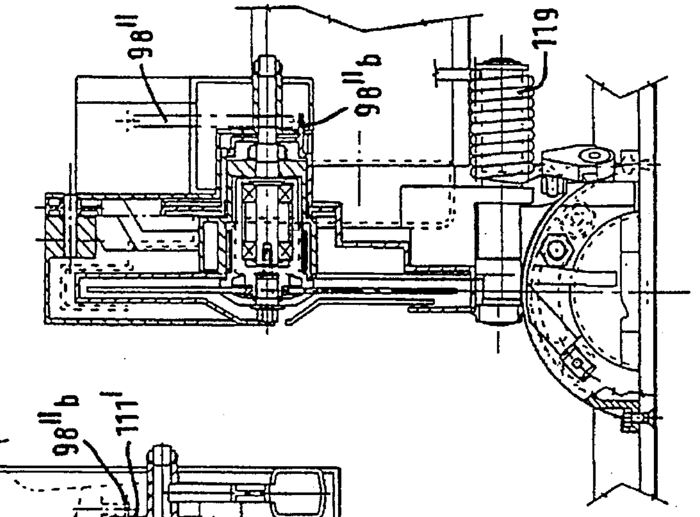
Figure 5D:
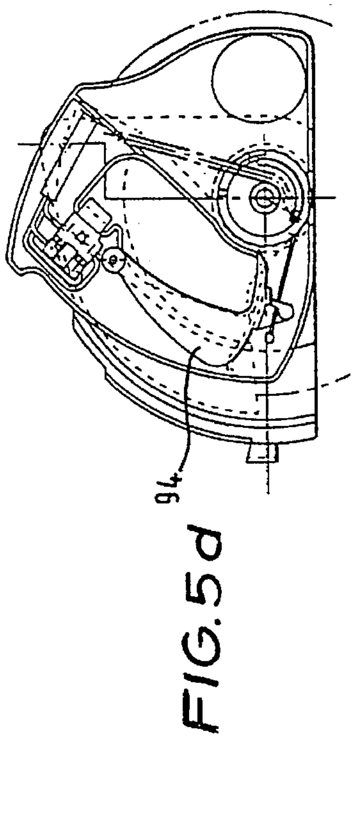

Returning now to FIGS. 3*a* to 3*d*, the saw 10 is shown in four positions in which the lower guard 40 is in positions corresponding to the positions shown in FIG. 2. In other words, FIG. 2*a* corresponds to FIG. 3*a*; FIG. 2*b* corresponds to FIG. 3*b*; FIG. 2*c* corresponds to FIG. 3*c*; and FIG. 2*d* corresponds approximately to FIG. 3*d*.

The parallelogram lever 34 has an extension 35 which abuts top surface 101 of the flange 100. Analysis of the geometry of the arrangement demonstrates that saw assembly 16 cannot pivot downwards from the position shown in FIG. 3*a* about axis 18 while extension 35 abuts flange 100. Thus this fulfills the safety requirement that, in the raised at-rest position of the saw assembly 16 as shown in FIG. 3*a*, there is a lock to hold the saw assembly 16 in that position. The lock is released by opening the lower guard 40 as described above to the position shown in FIG. 2*c* and FIG. 3*b*. Here the flange 100 has moved out from underneath the extension 35 and so the saw assembly 16 is now permitted to pivot about axis 18.

In FIG. 3*c*, the saw assembly 16 is pivoted down about axis 18 to cut workpieces positioned on the table 12 against fence 42. Between the positions in FIGS. 3*b* and 3*c*, the extension 35 engages a cam surface 103*a* of the flange 100 so that downward movement of the saw assembly 16 opens further the lower guard 40. In FIG. 3*d*, the lower guard 40 is fully withdrawn inside the upper guard 32.

The arrangement is organised so that for most typical workpieces of rectangular cross-section the lower guard 40 is always opened by the extension 35 before the lower guard 40 contacts the workpiece, but does not open so much that a dangerous amount of the blade is exposed above and in front of the workpiece. Obviously some compromises have to be made and the arrangement is more effective for some workpieces than it is for others. However, for awkward shapes which do not fit the geometry of this arrangement, the lower guard 40 can be opened by contact with the workpiece on its bottom edge 41. This facility appertains once the lower guard 40 has opened to the position in FIG. 3*b* and, for example, the lower guard 40 could be fully opened as in FIG. 3*d* even when the saw assembly 16 is in the position in FIG. 3*c* if the shape of the workpiece dictated this. In this event, cam surface 103*a* is separated from extension 35.

On the other hand, mere release of actuator lever 94 does not return the lower guard 40 to its fully closed position. This is only achieved when the saw assembly 16 is raised sufficiently to allow the guard flange 100 to slide under the extension 35.

An alternative arrangement is feasible in which the flange 100 is provided with a circumferential rack in front of it (not shown, but at position 106) around the cup 78 and the bottom 108 of the extension 35 is likewise provided with teeth (not shown) to engage the rack and provide a positive connection between the lower guard 40 and parallelogram lever 34. This would have the advantage that the lower guard 40 could not be manipulated open once the respective teeth had engaged but would have a twofold disadvantage. Firstly, to cater for typical awkward shapes of workpiece, the lower guard 40 would have to be arranged to be opened quite fully at an early stage of descent of the saw assembly 16. This would lead to more exposure of the blade above and in front of the workpiece for more regularly shaped workpieces than is desirable, or indeed as is provided by the preferred arrangement. Secondly, should even this measure be insufficient on some workpieces to prevent contact between the guard edge 41 and the workpiece, the saw assembly 16 would become jammed and be prevented from further descent because the lower guard 40 cannot open without downward movement of the assembly. Hence further cutting of the workpiece could not be accomplished. Thus the arrangement first described above employing simple contact between extension 35 and cam surface 103*a* to open the lower guard 40 is preferred.

FIGS. 4*a* to 4*d* show the above described arrangements in more detail. Here, extension 35' has a different shape. Also extension 102' of the actuator lever 94 is different in that it is long in order to fill the aperture (not shown) in the base of the handle 96 through which it passes in all conditions of the actuator lever 94, ie in every position thereof. Part 105 is connected to the base of the extension 102' which engages stop 104' in the edge of the cup 78 (passing through an opening 107 in the upper guard 32) and which carries eye 92.

FIGS. 1*a* and 1*d* also show an alternative arrangement of the lower guard return spring 98' described with reference to FIGS. 2*a* to 2*d*. Here, (see especially FIG. 1*d*) a coil spring 98' is wound around flange 109 of upper guard 32 around sleeve 82, one end passing through an arcuate slot 111 (see also FIG. 4*b*) in the upper guard 32 and engaging the lower guard cup 78. A cap 113 retains the spring in position, while a circlip on sleeve 82 retains the cap.

FIGS. 5*a* to 5*d* show another arrangement for the return spring 98" which is here connected to the upper guard 32 at 98"*a* and to a lug 98"*b* of the lower guard cup 78 which passes through an arcuate slot 111' in the upper guard 32.

Finally, above the actuator lever 94, a trigger switch 117 is formed in the handle 96 by which to start and stop the motor 22. Around axis 18 a coil spring 119 is provided which supports the weight of the saw assembly 16.

I claim:

1. A saw comprising:

a table;

a pivot member on said table;

a saw assembly pivotally attached to said pivot member, said saw assembly pivoting between a raised rest position and a lowered engaged position;

a blade;

a motor housed in said saw assembly, said motor driving said blade;

an upper guard to cover a part of said blade, said upper guard mounted so as to pivot relative to said saw assembly;

a lower guard to cover a part of said blade, said lower guard pivotally attached to said saw assembly;

a lever pivotally connected to said saw assembly and upper guard, said lever engaging said lower guard to prevent said saw assembly from pivoting when said saw assembly is in the raised rest position;

wherein, upon disengagement of said lever from said lower guard, said saw assembly pivots to said lowered engaged position, and upon pivoting of said saw assembly to said lower engaged position, said lever re-engages said lower guard to open said lower guard.

2. The saw as recited in claim 1 further comprising:

an extension attached to said lever;

a flange connected to said lower guard;

wherein, said extension abuts said flange when said saw assembly is in the raised rest position and thereby prevents said saw assembly from pivoting.

3. The saw as recited in claim 2 further comprising an actuator lever for effecting disengagement of said extension from said flange.

4. The saw as recited in claim 3 further comprising:

a cup connected to said lower guard;

a stop connected to said cup;

wherein said actuator lever engages said stop and prevents opening of said lower guard when said saw assembly is in the raised rest position, thereby preventing disengagement of said extension from said flange, actuation of said actuator lever disengages said actuator lever from said stop and thereby frees said lower guard to partially open, thereby disengaging said extension from said flange.

5. The saw as recited in claim 4 further comprising:

a cable connected from said actuator lever to said cup;

wherein said cable passes around part of said cup and actuation of said actuator lever both disengages said actuator lever from said stop and opens said lower guard by pulling said cable.

6. The saw as recited in claim 5;

wherein, said cable is disposed such that actuation of said actuator lever first disengages said actuator lever from said stop before opening said lower guard.

7. The saw as recited in claim 6, wherein, pulling said cable rotates said cup thereby rotating open said lower guard, and rotation of said lower guard rotates said flange, thereby disengaging said flange from said extension.

8. The saw as recited in claim 2, wherein said extension re-engages said flange as said saw assembly is pivoted to the lower engaged position to completely open said lower guard.

9. The saw as recited in claim 5, wherein said lower guard is biased towards a closed position.

10. The saw as recited in claim 5, wherein a spring is disposed between said upper guard and said flange to bias said lower guard towards a closed position.

11. A saw comprising:

a table;

a pivot member on said table;

a saw assembly pivotally attached to said pivot member, said saw assembly pivoting between a raised rest position and a lowered engaged position;

a housing comprising part of said saw assembly;

an axle mounted to said housing;

a blade mounted to said axle;

a motor to drive said blade;

an upper guard to cover a part of said blade, said upper guard pivotally mounted relative to said saw assembly;

a lower guard to cover a part of said blade, said lower guard is pivotally mounted to said housing such that said lower guard is in a closed position when said saw assembly is in the raised rest position and in an open position when said saw assembly is in the lowered engaged position;

a lever pivotally connected to said saw assembly and upper guard, said lever engaging said lower guard to lock said saw assembly in the raised rest position;

wherein, upon disengagement of said lever from said lower guard said saw assembly is unlocked and is pivotal to the lower engaged position and during pivoting of said saw assembly to said lower engaged position, said lever re-engages said lower guard to open said lower guard.

12. The saw as recited in claim 1 further comprising:

an extension connected to said lever;

a flange attached to said lower guard;

wherein said extension abuts said flange when said saw assembly is in the raised rest position and thereby locks said saw assembly in the raised rest position; and wherein partial opening of said lower guard while said saw assembly is in the raised rest position, rotates said flange out of abutment with said extension and thereby unlocks said saw assembly.

* * * * *